US012740569B2

(12) United States Patent
Cluff et al.

(10) Patent No.: US 12,740,569 B2
(45) Date of Patent: Sep. 22, 2026

(54) NANO-SYMBIOTIC CATALYST

(71) Applicants: Daniel Blake Cluff, Washington, UT (US); Duane E. Cutler, Pleasant Grove, UT (US); Jeremy Andra, Ivins, UT (US)

(72) Inventors: Daniel Blake Cluff, Washington, UT (US); Duane E. Cutler, Pleasant Grove, UT (US); Jeremy Andra, Ivins, UT (US)

( * ) Notice: Subject to any disclaimer, the term of this patent is extended or adjusted under 35 U.S.C. 154(b) by 271 days.

(21) Appl. No.: 18/768,257

(22) Filed: Jul. 10, 2024

(65) Prior Publication Data

US 2025/0261648 A1 Aug. 21, 2025

Related U.S. Application Data

(60) Provisional application No. 63/555,752, filed on Feb. 20, 2024.

(51) Int. Cl.

| | |
|---|---|
| ***C05F 11/08*** | (2006.01) |
| ***A01N 37/40*** | (2006.01) |
| ***A01N 43/84*** | (2006.01) |
| ***A01N 59/06*** | (2006.01) |
| ***A01N 61/00*** | (2006.01) |
| ***A01N 63/20*** | (2020.01) |
| ***A01N 63/30*** | (2020.01) |
| ***A01N 65/03*** | (2009.01) |
| ***A01N 65/44*** | (2009.01) |

(52) U.S. Cl.

CPC ............. *A01N 63/20* (2020.01); *A01N 37/40* (2013.01); *A01N 43/84* (2013.01); *A01N 59/06* (2013.01); *A01N 63/30* (2020.01); *A01N 65/03* (2013.01); *A01N 65/44* (2013.01)

(58) Field of Classification Search

CPC ......... C05F 11/08; A01N 61/00; A01N 63/20; A01N 63/30; A01N 25/00; C12R 2001/00

See application file for complete search history.

(56) References Cited

U.S. PATENT DOCUMENTS

| | | | |
|---|---|---|---|
| 5,147,441 A | 9/1992 | Megeed | |
| 8,728,460 B2 | 5/2014 | Spittle | |
| 11,629,328 B2 * | 4/2023 | Ashby | A01N 25/00 800/298 |
| 11,959,062 B2 | 4/2024 | Farmer et al. | |
| 2018/0201549 A1 | 7/2018 | Greenshields et al. | |
| 2021/0186026 A1 | 6/2021 | DiDonato Floro et al. | |
| 2021/0292255 A1 | 9/2021 | Farmer et al. | |
| 2022/0363607 A1 | 11/2022 | Zorner et al. | |
| 2024/0166572 A1 | 5/2024 | Zorner et al. | |

FOREIGN PATENT DOCUMENTS

| | | |
|---|---|---|
| CA | 2874890 A1 | 6/2016 |
| EP | 3325604 A2 | 5/2018 |

OTHER PUBLICATIONS

Veronica Artursson, et al., Interactions between arbuscular mycorrhizal fungi and bacteria and their potential for stimulating plant growth, Nov. 18, 2005, Environmental Microbiology (2006) 8(1), 1-10, Sweden.

Afeez Adesina Adedayo, et al., Fungi That Promote Plant Growth in the Rhizosphere Boost Crop Growth, Feb. 10, 2023, Food Security and Safety Focus Area, Faculty of Natural and Agricultural Sciences, North-West University, Private Bag X2046, Mmabatho 2735, South Africa, J. Fungi 2023, 9(2), 239.

Issam Meftah Kadmiri, Bioformulation of Microbial Fertilizer Based on Clay and Alginate Encapsulation, Oct. 26, 2020, vol. 78, pp. 86-94, (2021).

Shaimaa H. Abd-Elrahman, et al., Applications of Nanotechnology in Agriculture: An Overview, Egypt. J. Soil Sci. 55, No. 2, pp. 197-214 (2015), Egypt.

* cited by examiner

*Primary Examiner* — Maryam Monshipouri

(57) ABSTRACT

The nano-symbiotic catalyst described herein includes a mixture of a carbon source, water, microbes, a nano-sized organo-mineral complex known as Montmorillonite Alginate, and humic/fulvic acids. Microbes used in the nano-symbiotic catalyst may include microbes classified as Plant growth Promoting Rhizobacteria (PGPR) and Plant Growth Promoting Fungi (PGPF). The nano-symbiotic catalyst enhances the speed at which a beneficial microbe and plant form a symbiotically mutual relationship. Due to the nano-size and configuration of the nutrients, plant reception of these nutrients is increased while the amount of energy used to form this relationship and acquire beneficial nutrients is decreased. The nano-symbiotic catalyst may be used with multiple crops, soil types, and environmental conditions to reduce input costs and resources, increase agriculture production and quality, and enhance regenerative agriculture practices.

16 Claims, 1 Drawing Sheet

100
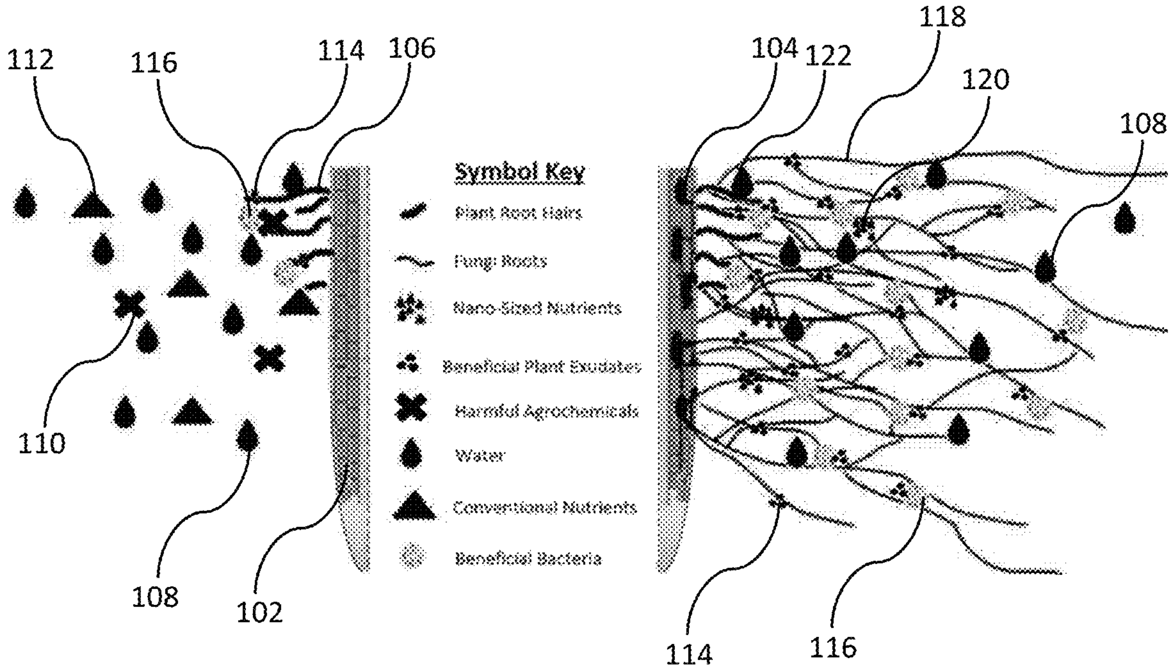
112
116
114
106
104
122
118
120
108
Symbol Key
Plant Root Hairs
Fungi Roots
Nano-Sized Nutrients
Beneficial Plant Exudates
Harmful Agrochemicals
Water
Conventional Nutrients
Beneficial Bacteria
110
108
102
114
116

NANO-SYMBIOTIC CATALYST

CROSS-REFERENCE TO RELATED APPLICATIONS

This application claims the benefit of U.S. Provisional Application Ser. No. 63/555,752, filed on Feb. 20, 2024, which is incorporated herein by reference.

TECHNICAL FIELD

The present disclosure relates to a nano catalyst composition for improving soil and plant growth. More particularly, the present disclosure relates to a nano catalyst composition for improving soil health and function, benefiting crop nutrient density, crop yield, and overall crop fitness in the agrobiome by increasing access to water and resources through a consortium of mutualistically symbiotic bacteria and fungi.

BACKGROUND

Post-World War II agriculture transitioned from natural delivery of nutrients and resources to synthetic fertilizers and agrochemicals. While these chemicals increased yield and production of industrial agriculture, crop nutrient density, soil health, and environmental pollution became leading environmental and human health concerns. Research has shown that this post-World War II approach destroys beneficial microbes in the soil and does little to restore essential minerals in the soil beyond Nitrogen, Phosphorus, and Potassium (NPK). Without beneficial microbes functioning in the soil, crops will continue to diminish in nutrient value and soils will become less productive over time.

Further, growing crops, grass, etc. in arid, and other regions, dependent on the use of synthetic fertilizers, weed killers, pesticides, is not sustainable. Poor soil health increases the demand and use of water. Agriculture dependent upon synthetic fertilizers, chemicals, and tilling, disrupt and reduce naturally occurring microbes in the soil that benefit crop production and soil health. Furthermore, agrochemicals can destroy and eliminate both pathogenic and beneficial microbes because their ability to reduce harmful microbes is non-targeted, meaning that beneficial microbes are reduced and eliminated as well. While crops, trees, and lawns are important and necessary to food security and environmental health, they require a majority of water and nutrient resources.

While synthetic fertilizers and agrochemicals have been proven to increase crop yield, they have also been proven to be carcinogenic, increase nutrient pollution to the environment, and decrease the nutritional density of our crops (Davis, D. R., Epp, M. D. & Riordan, H. D. (2004). Changes in USDA food composition data for 43 garden crops, 1950-1999. Journal of the American College of Nutrition, 23(6), 669-682). Further, studies have shown that for every pound of fertilizer used to grow crops, more than 40-80% of it is lost as pollution to bodies of water (e.g., rivers, lakes, ponds), soil, and air, which can lead to pollution and degradation of the environments connected to agricultural operations (https://www.usda.gov/media/blog/2016/06/07/nutrient-challenge-sustainable-fertilizer-management). This destruction can wreak havoc on the livelihoods of farmers and affect food prices and quality. In addition, although fertilizers can be effective, plants are typically competing for nutrients and water instead of functioning together to form beneficial symbiotic relationships.

Accordingly, there is a need for a product that enhances soil, conserves water, and promotes a symbiotic relationship among plants. The present invention seeks to solve these and other problems.

SUMMARY OF EXAMPLE EMBODIMENTS

In one embodiment, a nano-symbiotic catalyst described herein includes a mixture of a carbon source (e.g., molasses) water, microbes, Montmorillonite Alginate, and acids (e.g., Humic and Fulvic acids). Some, or in some embodiments all, of these components may be nano-sized, which allows them to be absorbed by targeted plants and microbes. The molasses in the nano-symbiotic catalyst may be present to provide nutrients and energy to the microbes. The nano-symbiotic catalyst may include microbes that are naturally occurring. The microbes may also be Non-Genetically Modified Organisms (Non-GMO). Microbes used in the nano-symbiotic catalyst may include microbes classified as Plant growth Promoting Rhizobacteria (PGPR) and Plant Growth Promoting Fungi (PGPF). It will be understood that the nano-symbiotic catalyst interacts with plants, whether crops, trees, etc., and can expedite a symbiotic relationship because these plants have the necessary nutrients at sizes that promote reception and energy conservation. The nano-symbiotic catalyst may be used with multiple crops, soil types, and environmental conditions to increase agriculture production, enhance food security, and empower farmers to improve the environment, and aid in climate change mitigation.

BRIEF DESCRIPTION OF THE DRAWINGS

FIG. 1 illustrates a diagram of a nano-symbiotic catalyst in soil.

DETAILED DESCRIPTION OF EXAMPLE EMBODIMENTS

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

It will be understood that the detailed description depicts only example embodiments, which are not to be considered limiting in scope. Reference to the invention, the present disclosure, or the like are not intended to restrict or limit the invention, the present disclosure, or the like to exact features or steps of any one or more of the exemplary embodiments disclosed herein. References to "one embodiment," "an embodiment," "various embodiments," and the like, may indicate that the embodiment(s) so described may include a particular feature, structure, or characteristic, but not every embodiment necessarily includes the particular feature, structure, or characteristic.

The particular arrangements disclosed herein are meant to be illustrative only and not limiting as to the scope of the invention. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described.

It will be understood that the steps of any such processes or methods are not limited to being carried out in any particular sequence or arrangement. In fact, the steps of the disclosed processes or methods generally may be carried out in various different sequences and arrangements while still falling within the scope of the present invention.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a product that enhances soil, conserves water, and promotes a symbiotic relationship among plants. The present invention seeks to solve these and other problems.

Crops have been an important part of sustaining life for many humans for thousands of years and will continue to be essential to maintaining life. With an increase in world population, the number, yield, and health of crops needs to increase to keep up with the rising populations. Due to this increase in population, many have turned to using additional agrochemicals, which leads to many environmental issues. Some of these issues may include soil, water, and air contamination and pesticide resistant insects. While there may be some benefits from using agrochemicals, there are just as many, if not more, downsides to using them. As discussed above, it has been shown that for every pound of fertilizer used to grow crops that more than 50% of it is lost as pollution to bodies of water (e.g., rivers, lakes, ponds), soil, and air. This type of environmental destruction can wreak havoc on the livelihoods of farmers, leading to increase in food prices, lack of food quality, among other issues. Because of this, farmers and food companies may not be able to keep up with the world's increasing population, which can lead to starvation and death.

In addition, plants that are dependent upon synthetic fertilizers rely upon a primary access to resources and water through their root hairs alone. Plants can interact with beneficial bacteria in the space between the root hair and the soil, known as the Rhizosphere. Plants take Carbon-based compounds known as Exudates, and release them into the Rhizosphere to attract and recruit beneficial microbes that can increase plant access to beneficial minerals in the soil. The Rhizosphere acts as a "glove" to the plant, increasing its access beyond the root hair an additional ~3 centimeters into the soil environment.

When beneficial Arbuscular Mycorrhizal Fungi (AMF) are present and thriving in the soil, a secondary pathway is introduced to the plant. Like root hairs, AMF can secrete Exudates into the soil and attract and recruit beneficial microbes which enhance access to resources in the soil. AMF can absorb nutrients in every section of the organism, allowing water and nutrients to more efficiently flow to plant root hairs. At the point of contact between AMF and plant root hairs, plants can exchange a portion of their Exudates created from photosynthesis for beneficial resources in the soil provided by the AMF. This network is known as the Hyphosphere, and creates a secondary pathway for nutrients and water to channel into the plant for increased production, plant health, environmental fitness, and enhanced plant interaction. Additionally, this secondary pathway can create a network of up to eight miles of AMF resource network for every one inch of plant root hair, dramatically increasing plant access to resources in the soil that would be unreachable. Furthermore, the AMF has the capacity to fuse together when in contact with other AMF in the soil, allowing plants to connect to each other through the AMF and exchange resources, communication, pest resistance, and unique compounds that plants can share with each other. While agriculture companies have experimented with biological inoculants intending to create this interaction, they have done so with varying levels of success.

The nano-symbiotic catalyst described herein was created to focus on the dynamics necessary for a plant and a beneficial microbe to form a thriving relationship, also known as an inoculation. The nano-symbiotic catalyst prepares microbes with nano-sized minerals before it comes into contact with the environment of the plant, creating a value in the microorganism before it comes into contact with the plant. Instead of expending energy in the environment to find minerals and break them down, these minerals are already in a nano-size, allowing the microbes to expedite a relationship with the plant root zone. The nano-symbiotic catalyst infuses multiple nano-sized elements with a broad array of beneficial microbes and fungi into existing agricultural systems limited to synthetic fertilizers, chemicals, and water delivery systems. The carbon sources (e.g., molasses) in the product provide energy necessary to activate microbes and initiate multiple generations of microbes before being applied to the crops. Humates and Fulvates are added to support healthy ionic exchange within the soil and facilitate microbial interactions with plants and microbes in the soil. Activated microbes absorb nano-sized minerals and nutrients within the activated mixture, increasing their fitness and ability to adapt to new environments and supporting them with minerals which will increase their potential to form mutualistic relationships with crop roots which they come into contact with. When a microbe is able to absorb valuable minerals and present a plant with nutrients which it is searching for in the soil, the ability to expedite or catalyze the inoculation and mutual relationship of the plant is high. The nano-sized elements that are not absorbed by microbes can also be absorbed by plants and channeled into growth and production through root hairs and foliar absorption. The differentiating factor of the nano-symbiotic catalyst compared to a standard inoculation of beneficial microbes in other methods is that the microbes are first activated, and exposed to nano-sized minerals, given time to absorb and consume these minerals before they are distributed into the plant environment, thereby decreasing the energy expended by the organisms (microbes and plants) to form a symbiotically mutualistic relationship. This increases the value added in the first exposure between beneficial microbes and plant root hairs and infuses essential and often depleted minerals in the environment into the plants through mutualistic microorganisms in the soil. By focusing on how to make this relationship happen between plants and beneficial microbes, the nano-symbiotic catalyst can be used with a broad spectrum of microbes and nutrients. By providing symbiotic microbes with the carbon source and nano-sized minerals in a contained environment (such as an agitator or nutrient tank), microbes can be activated and enhanced with elements that speed up the inoculation or connection between a plant and a beneficial microorganism, which acts as the foundation of the nano-symbiotic catalyst.

The nano-symbiotic catalyst described herein may include one or more nano-sized nutrients, among other components. Due to the combination of nano nutrients and other elements discussed below, the nano-symbiotic catalyst promotes growth of all plants while decreasing competition between plants and reducing pollution to the environment. The nano-symbiotic catalyst which is the combination of symbiotically mutualistic fungi (PGPF) and bacteria (PGPM) with humates, fulvates, a carbon source (e.g., molasses), and Montmorillonite Alginate. Montmorillonite Alginate is a chelated organo-mineral deposit comprised of one or more nano-sized minerals. The differentiating factor of including nano-sized elements with mutualistic microbes increases the inoculation capacity of microbes to crops, referred to as a catalyst (i.e., the nano-symbiotic catalyst. Further, the nano-symbiotic catalyst is a composition of biotechnology and nano-sizing elements designed for improving soil health and function, benefiting crop nutrient density, crop yield, and overall crop fitness in the agrobiome. As an added value, enhancing soil health through this combined approach is a regenerative agriculture practice which transitions conventional agriculture into an environmentally supportive system. This leads to a reduction in high fertilizer use and concentrated agrochemicals, and decreases nutrient and chemical pollution to the air, land, and water resources which agriculture influences. Once the mutualistic relationship is formed due to the nano-symbiotic catalyst, crops have increased drought tolerance, immune system response to pests, advanced access to resources, and can potentially share resources from plant to plant, transitioning from a competition interaction between neighboring plants to a cooperative networking between neighboring plants.

This advanced soil network supports farmers in reducing water input, and reducing synthetic fertilizer use by delivering nutrients and minerals to crops via nano-sized organo-mineral materials through various plant growth promoting bacteria and fungi (PGPM and PGPF). One of the focuses of nano-symbiotic catalyst is to expedite, or catalyze, the inoculation potential between beneficial microbes and plants with a nano-sized consortium of minerals. In some embodiments, microbes included within the consortium of the nano-symbiotic catalyst may be Non-GMO, naturally occurring, Biosafety Level 1 (BSF-1) organisms. Any other components in the nano-symbiotic catalyst may be organic in nature and environmentally safe. In addition, infusing the nano-symbiotic catalyst has the capacity to reduce water and synthetic fertilizer use by 30-50%, while increasing crop nutrient density and crop yield.

In one embodiment, the nano-symbiotic catalyst described herein includes a mixture of a carbon source (e.g., molasses), water, microbes, Montmorillonite Alginate, and acids. Some or all of the components of the nano-symbiotic catalyst may be nano-sized, which allow them to be absorbed by targeted plants and microbes more effortlessly. The carbon source may be found in the nano-symbiotic catalyst at a range of 45%-75%, or more preferably, at a range of 50%-70%. The carbon source in the nano-symbiotic catalyst may be present to provide nutrients and energy to the microbes and to any of the one or more nano-sized nutrients that benefit from the carbon source. Further, water may be present in the nano-symbiotic catalyst at a range of 10%-35%, or more preferably at a range of 15%-30%.

The nano-symbiotic catalyst may include microbes that are naturally occurring. In other embodiments, the microbes may be non-naturally occurring microbes (i.e., synthetic microbes). The microbes may also be Bio-Safety Level 1 (BSF-1) microbes, meaning microbes not known to cause harm to individuals (e.g., laboratory personnel) or the environment. The microbes may also be non-genetically modified organisms (Non-GMO). However, it will be appreciated that, in some embodiments, the microbes may be genetically modified organisms (GMO) or some combination/mixture of GMO and non-GMO microbes. Microbes used in the nano-symbiotic catalyst may include microbes classified as Plant Growth Promoting Rhizobacteria (PGPR) and Plant Growth Promoting Fungi (PGPF).

PGPR microbes may include *Arthrobacter globiformis, Aspergillus oryzae, Azospirillum brasiliense, Azosprilrilum lipoferum, Azotobacter chroococcum, Azotobacter vinelandii, Bacillus amyloliquifaciens, Bacillus atrophaeus, Bacillus lichenformis, Bacillus megatarium, Bacillus subtillus, Bacillus pumilus, Bacillus thuringiensis, Glomus intraradices, Glomus mosseae, Glomus aggregatum, Micrococcus luteus, Glomus etunicatum, Pseudomonas flourescens, Pseudomonas putida*, and *Streptomyces griseus*. While the aforementioned PGPR microbes are disclosed, it will be understood that the nano-symbiotic catalyst is not limited to using PGPR microbes from that list and may rely on others. The PGPR microbes may be present in the nano-symbiotic catalyst at a range of 1% to 20% of the total ingredients, or more preferably, at a range of 5% to 15%.

PGPF microbes may include, but are not limited to, *Trichoderma harzianum*, and *Trichoderma reesei, Aspergillus flavus, Gliocladium virens, Penicillium digitatum, Actinomucor elegans*, and *Podospora bulbillosa*. It will be understood that the microbes and the one or more nano-sized nutrients interact with plants, whether crops, trees, etc. and can expedite a relationship thereinbetween, because these plants have the necessary ingredients at sizes that promote reception, which decreases competition amongst plants.

In some embodiments, the nano-sized components of the nano-symbiotic catalyst may include, but are not limited to, nitrogen (N), phosphorus (P) and potassium (K), Humates, and Fulvates and all minerals contained within Montmorillonite Alginate. Montmorillonite Alginate may be present in the nano-symbiotic catalyst in a range of 5% to 25%, or more preferably, 10%-20%. Montmorillonite Alginate may include, but is not limited to, potash, nitrogen, sulfur, phosphate, magnesium, boron, manganese, calcium, zinc, molybdenum, copper, and iron. The following example is provided to illustrate Montmorillonite Alginate and its composition in the present invention:

| Ingredient | Amount (wt. %) |
|---|---|
| Potash (K2O5) | 6.584% |
| Nitrogen (N) | 6.570% |
| Sulfur (S) | 4.576% |
| Phosphate (P2O5) | 3.587% |
| Magnesium (Mg) | 1.852% |
| Boron (B) | 0.104% |
| Manganese (Mn) | 0.090% |
| Calcium (Ca) | 0.079% |
| Zinc (Zn) | 0.018% |
| Molybdenum (Mo) | 0.015% |
| Copper (Cu) | 0.010% |
| Iron (Fe) | 0.002% |

Montmorillonite Alginate is an organo-mineral complex with chelated naturally-occurring minerals that benefit agriculture production and improve soil.

The nano-symbiotic catalyst may also comprise a humic substance, which includes Fulvic and/or Humic acids. Fulvic acids may include Free-Form Fulvic Acids or Fulvates. It will be understood that other acids known in the art may be used. The humic substance may be present in the nano-symbiotic catalyst at a range of 1% to 15% of the total ingredients, or more preferably, at a range of 2% to 10%.

Due to Montmorillonite Alginate being nano-sized, among other components in the nano-symbiotic catalyst, the nutrients are more bioavailable to plants and microbes, thus spreading up the rate at which a mutualistic relationship can be formed. The Nano-Symbiotic Catalyst has at least the following advantages in agriculture production: (1) An increase in production and nutrient transfer due to the minerals being more easily broken down and absorbed because of their size. This is important to creating a symbiotic relationship among plants, as discussed below, because organisms, such as plants and microbes, benefit by not expending energy to break down these minerals. Accordingly, the energy that would usually be necessary to break down the minerals is put to use in increasing growth in the plants and in increasing the functions and ability of the microbes, thereby creating healthier crops that yield more fruit, vegetables, etc. (2) An increase in symbiotic relationships that comes from the use of the nano-sized nutrients. That is, when plants and microbes utilize and are supported by the nano-symbiotic catalyst, the likelihood of rapidly establishing a symbiotic relationship is improved. While, in some instances, there may be macro-elements (e.g., Nitrogen, Potassium, and Phosphorus) used in small amounts, as an example, Montmorillonite Alginate compensates for the macro elements and provides minerals to soils that are often missing. (3) A decrease in Fertilizer use. Due to the efficiency of the nano-symbiotic catalyst, synthetic fertilizers can potentially be reduced 30-50%, which leads to increased crop health and production with less harm to the environment and an increase to human health. (4) A decrease in water usage due to plants having an enhanced microbial relationship with fungi that can increase the surface area absorption ability in the root zone absorption area through the PGPF and PGPM. As this microbe network establishes in the soil, nutrients and water can be transported to the plant roots. When these microbes encounter each other, they fuse together and allow water and nutrients to be transferred between plants. The nano-symbiotic catalyst supports plant roots connecting and allows plants to support each other instead of competing against each other. (5) There is an increase in fitness and health, meaning that plants can acquire nutrients and water with less work and can use the saved energy for growth and development. Plants that can share resources and communication through microbes can increase resistance to pests and adapt better to harsh climate variations that crops experience in various regions throughout the world. For example, crops in arid conditions would benefit from the increased communication and sharing of resources. Because of this, crops, which would not typically survive in arid or other difficult environments, may begin to thrive.

FIG. 1 illustrates a soil system 100 with the nano-symbiotic catalyst and a conventional soil sample. A first plant root 102 on the left side of the diagram is shown being subject to typical, existing agriculture shortfalls, while the right side depicts a second plant root 104 that interacts with the nano-symbiotic catalyst. The left side, relying on existing agriculture, includes the first plant root 102 with plant root hairs 106 that interact with water 108, agrochemicals 110 (e.g., pesticides or fertilizers), conventional nutrients 112, beneficial plant exudates 114, and beneficial bacteria 116. The root hairs 106 absorb and intake anything that they are in contact with, whether growth promoting or harmful. Because a lot of the nutrients in existing agriculture are not in a configuration to be easily absorbed by the plant root hairs 106, the plant has to use excessive energy to break down nutrients. In existing agriculture, plants do not work in a symbiotic relationship, but compete with each other, meaning some plants continue to grow and maintain a healthy life cycle while others perish. With the presence of the agrochemicals 110, beneficial microbes cannot survive in the soil, and the environment is often polluted and/or damaged.

On the other hand, and as shown on the right side of FIG. 1, the soil includes water 108, fungi root 118, beneficials plant exudates 114, nano-sized nutrients 120, and beneficial bacteria 116. The soil with the nano-symbiotic catalyst includes a soil environment where second plant root hairs 122 absorb not only nutrients they are in contact with, but absorb what fungi and bacteria can contact. Due to the nano-sized components/nutrients, plants expend minute amounts of energy when absorbing the nutrients and transfers of the nutrients from plants and microbes is easier. The maintained fungi due to the nano-symbiotic catalyst allows crops to share excess nutrients and water with each other instead of competing for these essential components. All the beneficial microbes are not killed by agrochemicals, allowing them to increase plant health and performance. Overall, there is a decrease in nutrient loss and pollution to the soil, water, and air.

It will be appreciated that the nano-symbiotic catalyst may be used with multiple crops, soil types, and environmental conditions to increase agriculture production, enhance food security, and empower farmers to improve the environment and climate while enhancing the economic security of their livelihood. It will further be appreciated that the nano-symbiotic catalyst may reduce water use, plant energy expenditure, and fertilizer use in crops within weeks; decrease input costs and improve crop value while increasing production and yield; and reduce agrochemicals, improve soil health, and cut back pollution to our air, soil, and water.

The following example is provided to further illustrate the composition of the present invention.

| Ingredient | Amount (wt. %) |
|---|---|
| Molasses | 50-70% |
| Water | 15-30% |
| PGPR Microbes | 5-15% |
| Montmorillonite Alginate | 10-20% |
| Humic/Fulvic Acids | 2-10% |
| Other Ingredients | 5-10% |

The ranges of the above ingredients represent variation in batches.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure. The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A nano-symbiotic catalyst comprising:
a carbon source;
water;
microbes; fluvic acids; humic acids; and
montmorillonite alginate.

2. The nano-symbiotic catalyst of claim 1, wherein the carbon source comprises molasses.

3. The nano-symbiotic catalyst of claim 1, wherein the microbes are Non-GMO, naturally occurring microbes.

4. The nano-symbiotic catalyst of claim 1, wherein the microbes are mutually symbiotic microbes.

5. The nano-symbiotic catalyst of claim 1, wherein the microbes are plant growth promoting rhizobacteria.

6. The nano-symbiotic catalyst of claim 5, wherein the plant growth promoting rhizobacteria comprises at least one plant growth promoting rhizobacteria selected from the group consisting of:
*Arthrobacter globiformis, Aspergillus oryzae, Azospirillum brasiliense, Azosprilrilum lipoferum, Azotobacter chroococcum, Azotobacter vinelandii, Bacillus amyloliquifaciens, Bacillus atrophaeus, Bacillus lichenformis, Bacillus megatarium, Bacillus subtillus, Bacillus pumilus, Bacillus thuringiensis, Glomus intraradices, Glomus mosseae, Glomus aggregatum, Micrococcus luteus, Glomus etunicatum, Pseudomonas flourescens, Pseudomonas putida*, and *Streptomyces griseus.*

7. The nano-symbiotic catalyst of claim 1, wherein the microbes comprise a combination of plant growth promoting rhizobacteria and plant growth promoting fungi.

8. The nano-symbiotic catalyst of claim 1, wherein montmorillonite alginate comprises potash, nitrogen, sulfur, phosphate, and magnesium.

9. The nano-symbiotic catalyst of claim 1, further comprising a plurality of nano-sized nutrients.

10. The nano-symbiotic catalyst of claim 9, wherein the plurality of nano-sized nutrients comprises boron, manganese, calcium, zinc, molybdenum, copper, and iron.

11. The nano-symbiotic catalyst of claim 1, wherein montmorillonite alginate is a nano-sized organo-mineral complex.

12. A nano-symbiotic catalyst comprising:
a carbon source;
water; fluvic acids; humic acids; montmorillonite alginate; and
at least one plant growth promoting rhizobacteria selected from the group consisting of:
*Arthrobacter globiformis, Aspergillus oryzae, Azospirillum brasiliense, Azosprilrilum lipoferum, Azotobacter chroococcum, Azotobacter vinelandii, Bacillus amyloliquifaciens, Bacillus atrophaeus, Bacillus lichenformis, Bacillus megatarium, Bacillus subtillus, Bacillus pumilus, Bacillus thuringiensis, Glomus intraradices, Glomus mosseae, Glomus aggregatum, Micrococcus luteus, Glomus etunicatum, Pseudomonas flourescens, Pseudomonas putida*, and *Streptomyces griseus.*

13. The nano-symbiotic catalyst of claim 12, further comprising one or more nano-sized nutrients.

14. A nano-symbiotic catalyst comprising:
molasses;
water;
plant growth promoting rhizobacteria microbes; and
montmorillonite alginate comprising:
potash, nitrogen, sulfur, phosphate, magnesium, boron, manganese, calcium, zinc, molybdenum, copper, and iron; and
fulvic acids.

15. The nano-symbiotic catalyst of claim 14, further comprising plant growth promoting fungi.

16. The nano-symbiotic catalyst of claim 14, further comprising humic acids.

* * * * *